United States Patent [19]
Needham et al.

[11] 3,932,000
[45] Jan. 13, 1976

[54] ADAPTIVE BRAKING SYSTEM REFERENCE PULL DOWN

[75] Inventors: James M. Needham, South Bend, Ind.; Robert E. Weber, Newport News, Va.

[73] Assignee: The Bendix Corporation, Southfield, Mich.

[22] Filed: Sept. 11, 1974

[21] Appl. No.: 504,944

[52] U.S. Cl. ............................ 303/21 BE; 188/181 C
[51] Int. Cl.² ............................................ B60T 8/10
[58] Field of Search ...... 188/181 C; 303/20, 21 AU; 307/10 R; 317/5; 324/161; 340/53, 62, 263

[56] References Cited
UNITED STATES PATENTS

| | | | |
|---|---|---|---|
| 3,744,855 | 7/1973 | Ochiai | 303/21 BE |
| 3,804,470 | 4/1974 | Slavin et al. | 303/21 BE |
| 3,832,008 | 8/1974 | Leiber et al. | 303/21 EB X |
| 3,848,933 | 11/1974 | Ochiai | 303/21 BE |

*Primary Examiner*—Trygve M. Blix
*Assistant Examiner*—Stephen G. Kunin
*Attorney, Agent, or Firm*—W. G. Christoforo; Bruce L. Lamb

[57] ABSTRACT

In an adaptive braking system for wheeled vehicles such as automobiles a braking force attenuator and logic are provided to automatically reduce braking force if, during braking, wheel skid becomes imminent, as evidenced by power train dynamic performance with respect to certain first criteria. Subsequently, braking force is increased if power train performance satisfies certain other criteria, at which time the first criteria is altered and then allowed to return to original levels so that during the alteration period the power train dynamic performance must be more indicative of imminent wheel skid than otherwise required to reduce braking force.

20 Claims, 8 Drawing Figures

ADAPTIVE BRAKING SYSTEM REFERENCE PULL DOWN

BACKGROUND OF THE INVENTION

This invention relates to adaptive braking systems for wheeled vehicles, such as automobiles and the like, and more particularly to improvements in their logic systems which will eliminate or alleviate the condition known as wheel (or axle) wrap-up.

In adaptive braking systems using logic circuits to control vehicle braking during incipient wheel skid conditions, at least one sensor means is ganged to a portion of the vehicle power train such as a wheel, drive, shaft, speedometer cable, etc. and used to generate a signal proportional to rotational dynamic performance of the portion such as speed or acceleration.

In adaptive braking systems using speed logic, the dynamic performance sensed is speed and the sensor means generates a speed signal which is related to the instantaneous rotational speed of the rotating structure. Means are provided in the speed logic for memorizing a reference signal also related to speed but generally offset somewhat from the instantaneous speed represented by the speed signal. The logic is arranged so that the reference speed signal will track the speed signal, except that the rate of decay of the reference speed signal is limited. Thus, if after the vehicle brakes are applied, the speed signal should decay faster than the reference speed signal can follow, the speed represented by the speed signal will become equal to the speed represented by the reference speed signal. At that time or at a time related thereto the adaptive braking system will automatically operate to release braking force. However, due to inherent system delays, the speed and hence the speed signal will continue to decay so that it will represent a speed less than the reference speed. Eventually, in response to reduced braking pressure, the speed and hence the speed signal will begin to increase until the speed signal will again become equal to the reference speed signal. At that time or at a time related thereto the adaptive braking system operates to reapply braking force. Again, due to inherent delays in the system, speed of the sensed structure will not immediately begin to decrease in response to reapplied braking force but rather will continue to increase for some time. The speed signal, of course, follows the increasing speed and the reference speed signal also increases in response thereto. Subsequently, the inherent system delays are overcome and the restored braking force becomes effective to cause the sensed structure to again begin to slow down. At this time the phenomenon which has come to be known as wheel wrap-up occurs and which is characterized by sudden and short bursts of rapid wheel deceleration and subsequent acceleration accompanied by rapid fluctuations of the speed signal. Since the reference speed signal tracks the speed signal, this rapid pulsating of the wheel speed can cause the adaptive braking system to operate to release and restore braking force alternately in short cycles. This pulsating of braking force is undesired and normally results in reduced braking efficiency. It is thus an object of this invention to provide means to prevent certain causes of unnecessary and undesirable braking force fluctuations in an adaptive braking system operating in accordance with speed logic.

In adaptive braking systems using acceleration logic, the dynamic performance sensed is acceleration. In certain systems speed may be actually sensed and acceleration derived therefrom; however, in any event, at least acceleration of the sensed structure is considered by the logic section of the adaptive braking system to effect automatic control of braking force. This is accomplished by providing a first reference signal corresponding to some value of negative acceleration (deceleration) an comparing the acceleration signal against the first reference signal. When these two signals attain some predetermined relationship with each other, usually equal to each other, the system operates to at least initiate attenuation of braking force. Thereafter and in response thereto, the acceleration of the vehicle wheels will change. When a predetermined subsequent change has occurred the system operates to restore braking force. As discussed with respect to speed logic adaptive braking systems, wheel wrap-up at this time causes sudden and short bursts of rapid wheel deceleration and subsequent accelerations. This rapid pulsation can force the adaptive braking system to release and restore braking force alternatively in short cycles causing reduced braking efficiency. It is an object of this invention to provide means to alleviate the effects of wheel wrap-up in acceleration controlled adaptive braking systems.

SUMMARY OF THE INVENTION

The above mentioned objects of the invention are accomplished by rapidly altering, in response to the restoration of braking force, the reference or criteria against which the dynamic performance signal is compared to effect release of braking force. The alteration is made in the direction to require that wheel skid be even more imminent than had the invention not been used. In speed logic systems the reference speed signal is altered in the direction of decreased speed to a level corresponding to zero or some minimum speed. In acceleration logic systems the first reference signal is altered in a direction of more negative acceleration.

Subsequently, the altered reference signal is allowed to return relatively slowly to normal levels. In speed logic systems it returns to the level normal for the speed signal instantaneously obtained. In acceleration logic systems it returns to its earlier level. During the time that the altered reference signal is returning to normal levels it is still possible for the logic to effect automatic release of braking force; however, the dynamic performance signal must, during this time, be indicative that wheel skid is even more imminent than had the invention not been used. As mentioned above, with the criteria for effecting automatic release of braking force becoming increasingly less severe, with respect to required dynamic performance of the sensed portion, as time increases, until normal criteria levels are restored. The invention thus differs from blanking systems which prevent any automatic release of braking force for a predetermined time after braking force is restored regardless of the imminence of wheel skid.

DESCRIPTION OF THE PREFERRED EMBODIMENT

In the present description the terms speed signal, wheel speed signal, or rotational speed signal refer to the speed signal generated by a snesor which senses the speed of some structure having ultimate contact with the road bed on which the vehicle is operating. In an obvious sense, the aforementioned structure can be a wheel or group of wheels and can include the power train for driving the wheels. Thus, the speed signal can be derived by sensing the speed of a single wheel, group of wheels, axle, drive shaft, speedometer cable, or other like structure.

Figures 1, 2, 3:
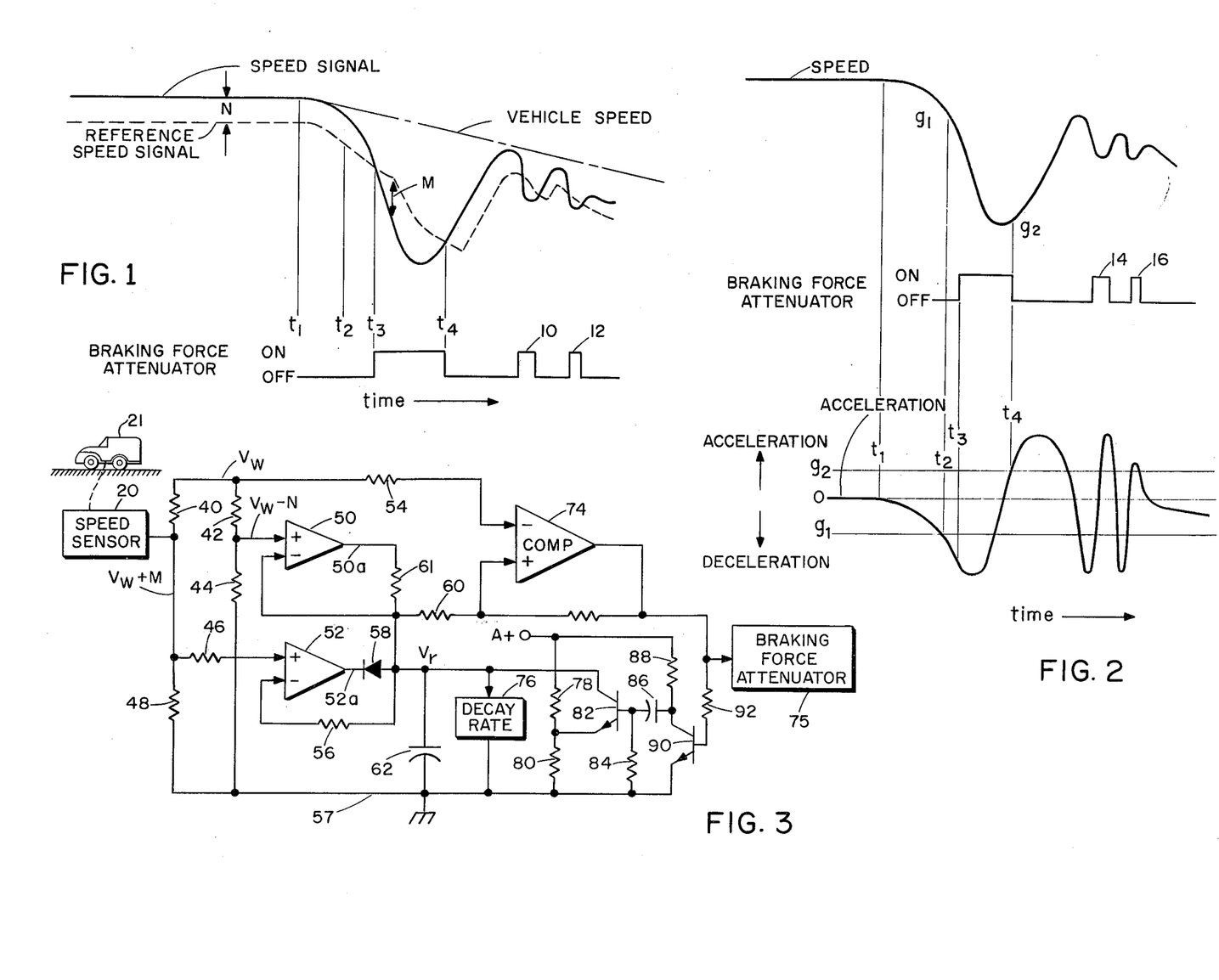
FIG. 1 comprises a set of curves drawn to a common time base which illustrates the performance of speed logic adaptive braking system and additionally showing the effects of wheel wrap-up.
FIG. 2 comprises a set of curves drawn to a common time base which illustrates the performance of an acceleration logic adaptive braking system and also showing the effects of wheel wrap-up.
FIG. 3 is a modified schematic which embodies the invention in an adaptive braking system using speed logic.

The undesirable effects of wheel or axle wrap-up sought to be cured by the present invention are illustrated with respect to an adaptive braking system operating in accordance with speed logic principles by the curves of FIG. 1, reference to which figure should now be made. In the curves a representative speed signal is shown in full line and a reference speed signal is shown in dashed line. It is assumed that the brakes are applied at a time $t_1$ so that prior to that time the speed signal is synchronous with and provides a measure of vehicle speed. However, after time $t_1$ the speed signal is no longer synchronous with the vehicle speed as illustrated by the departure of the speed signal from a construction line which illustrates vehicle speed. A reference speed is generated in response to the speed signal but normally offset an amount N therefrom as illustrated. The means for generating the reference speed are known to those skilled in the art and will be described briefly below but do not comprise the present invention. The reference speed signal generally follows or tracks the speed signal, displaced therefrom, except that the means for generating the reference speed is limited to permit the reference to decay at only a certain maximum decay rate. Thus, at a time $t_2$, where it is assumed that the speed signal starts to decrease at a rate greater than the aforementioned decay rate so that the reference speed is limited to that decay rate, the speed signal will start to approach the reference speed and will eventually intersect therewith at time $t_3$. In the known adaptive braking systems operating in accordance with speed logic principles a comparator is provided which compares the speed signal against the reference speed signal and operates to energize a braking force attenuator ON when the two become equal to automatically begin attentuation of the braking force. Due to inherent system delays the attenuation of braking force is not immediately effective so that the speed signal continues to decrease while the reference speed, which is limited to its decay rate, continues to decay at a slower rate. The offset between the speed signal and the reference signal thus continues to increase until the offset becomes equal to some predetermined amount M. Thereafter, the reference speed signal will track the speed signal down while maintaining the predetermined offset. However, past the minimum point of the speed signal the offset can no longer be maintained so that the reference speed signal again decays along a predetermined slope, approaching the speed signal and eventually intersecting therewith at time $t_4$. At that time, as known to those skilled in the art, the system comparator operates to energize the brake force attenuator to the OFF condition which thereby operates to begin restoration of braking force automatically. Again, due to inherent system delays, the restoration of braking force is not immediately effective so that the speed signal continues to increase towards vehicle speed. The reference speed signal, however, continues to decrease until the offset between the speed signal and the reference speed reaches the predetermined offset at which time the reference speed signal will track the speed signal upward. It can be appreciated that the time interval between $t_3$ and $t_4$ is relatively short and the rapid release and subsequent reapplication of the braking force will cause wheel or axle wrap-up because of the inertia of the vehicle drive train. Wrap-up phenomena is illustrated at the latter end of these curves where the speed signal fluctuates rapidly, passing through the reference speed signal at a number of points as the reference speed signal varies in accordance with the principles implicit in the above description. In this illustration two undesired episodes of braking force attenuation occur as illustrated by pulses 10 and 12. These undesired episodes are very short but nevertheless result in an overall decrease in the average braking force and hence, somewhat less than optimum braking for the conditions encountered.

Other forms of speed logic adaptive braking systems are also known, some of which have slightly different functional characteristics than those illustrated by the curves of FIG. 1. For example, in certain systems the downward sloping reference speed signal may be caused to change slope at some point such as at the intersection of the reference speed signal with the speed signal. Other systems may not have the track down feature of the system whose performance is illustrated by the curves of FIG. 1. In that type of system the offset M is not maintained between the reference speed signal and the speed signal while the former signal is above the latter. In that type of system the reference speed signal decays along a certain slope until is passes through the speed signal and is again below the speed signal by a predetermined amount, at which time the reference speed signal will begin to track the speed signal upward. In any event, the specific speed logic employed is not the present invention but various logic schemes are shown to illustrate the environments in which the invention can operate.

Refer now to FIG. 2 which shows curves illustrating the undesirable effect of wheel or axle wrap-up in an acceleration controlled adaptive braking system. In this figure a speed curve is shown which corresponds to the sensed speed of a wheel, group of wheels, drive shaft or other like structure. Downward direction of the curve illustrates deceleration while upward direction of the curve illustrates acceleration.

A second curve shows acceleration with the area below the horizontal zero axis being negative acceleration or deceleration and the area above the zero axis positive acceleration. All curves are shown to a common time scale. As before, the vehicle brakes are applied at time $t_1$ so that prior to that time wheel speed and vehicle speed are synchronous. Subsequent to $t_1$ wheel speed begins to decrease until at time $t_2$ wheel deceleration becomes equal to a first reference deceleration, herein termed $g_1$. In the known adaptive braking systems which operate in accordance with acceleration control principles, means are provided for attenuating braking force when the acceleration reaches the $g_1$ level, or alternately circuits are then energized which permit the braking force to be attenuated only after further criteria are satisfied. These criteria can be a further decrease in wheel speed which in this illustration occurs at $t_3$ at which time the adaptive braking system operates to begin attenuation of the braking force. Again, due to inherent system delays, attenuation of braking force is not immediately effective so that the speed continues to decrease until eventually the speed again begins to increase, in other words, the sensed portion begins to accelerate, eventually accelerating to a $g_2$ reference level, which level is preset in the adaptive braking system and compared with the acceleraton signal. At that time, $t_4$, the system operates to restore braking force. The action here is somewhat similar to that found previously in the assumed adaptive braking system which operated in accordance with speed logic principles, and results in the condition known as wheel or axle wrap-up to produce rapidly fluctuating acceleration signals which in turn results in the undesired brake attenuation episodes 14 and 16.

Refer now to FIG. 3 which shows a modified schematic of an embodiment of the invention as used in an adaptive braking system which operates in accordance with speed logic principles. A speed sensor 20 is coupled to and senses the speed of some structure of vehicle 21 haing ultimate contact with the road bed on which the vehicle is operating. As previously mentioned, this structure can be any part of the vehicle power train and is preferably a brakeable vehicle wheel. Speed sensor 20 is seen supplying d.c. voltage to the voltage divider comprised of resistors 40, 42 and 44. Since the output of speed sensor 20 is a d.c. voltage proportional to the speed of the structure it is sensing, it is also proportional to speed plus a constant where the constant is determined by the ratio of the voltage divider. Hence, the output of the speed sensor is termed the $V_w + M$ signal where M is the constant seen in FIG. 1. Proper choice of the resistors in the resistance bridge permits the $V_w$ signal to appear at the junction between resistors 40 and 42 and $V_w - N$ signal at the junction between resistors 42 and 44, where N was previously seen in FIG. 1 also. This latter junction is connected to the non-inverting terminal of operational amplifier 50 connected to have a unity gain. A feedback resistor 61 is connected between the operational amplifier 50 output terminal 50a and its inverting input terminal. Operational amplifier 50 and resistor 61 comprise an acceleration memory update for capacitor 62, across which capacitor a voltage corresponding to the reference speed signal of FIG. 1 is impressed. Operational amplifier 50 is connected in this embodiment so that its output terminal 50a is a current supply. That is, current can be supplied from terminal 50a into resistor 61 but cannot be delivered from resistor 61 into terminal 50a. Operational amplifiers connected as current supplies and having a unity gain are well known in the art. The inverting terminal of operational amplifier 50 is also connected to one plate of capacitor 62 whose other plate is connected to a common potential reference such as ground.

The $V_w + M$ signal is applied through resistor 46 to the non-inverting terminal of operational amplifier 52 also connected to have unity gain. The output terminal 52a of this latter operational amplifier is connected to the cathode of diode 58 whose anode is connected to the first plate of capacitor 62. The anode of diode 58 is also connected in feedback relationship through resistor 56 to the inverting terminal of operational amplifier 52. The parallel return path of the $V_w + M$ signal is provided by resistor 48. Operational amplifier 52 together with resistor 56 and diode 58 comprise further means of updating the memory comprised of capacitor 62. Operational amplifier 52 is connected so that its output terminal 52a is a current sink. Diode 58 permits current to flow from capacitor 62 into terminal 52a only when $V_r$, the voltage across capacitor 62 and which represents the reference speed, is high enough with respect to $V_w + M$ to overcome the diode voltage drop. This diode voltage drop is relatively small and is generally ignored in this description.

The $V_w$ signal is applied through resistor 54 to the inverting input terminal of operational amplifier 74 connected as a comparator. The first plate of capacitor 62 is connected through resistor 60 to the non-inverting input terminal of operational amplifier 74. In this embodiment it is preferable that resistor 60 be made equal to resistor 54 so that the signal on capacitor 62, that is, the reference speed signal $V_r$, is compared directly against the speed signal $V_w$.

Capacitor 62 is shunted by a decay rate control circuit 76 which bleeds charges from the capacitor. Circuit 76 can comprise, at the designer's option, a resistor, a constant current source, or other like elements or combination of elements to produce the constant slopes of the reference speed seen in FIG. 1.

The operation of the device of FIG. 3 to this point is as follows. The $V_w - N$ signal is generally maintained across capacitor 62 due to the action of operational amplifier 50. Since the $V_w - N$ signal is at a lower potential than the $V_w + M$ signal, diode 58 is maintained back-biased and, assuming transistor 82, to be described below, is not conductive, the sole discharge path of capacitor 62 is through decay rate circuit 76. However, under steady state conditions charges are supplied from operational amplifier 50 at the same rate they are withdrawn by decay rate circuit 76 during the time that $V_r$ is equal to $V_w - N$. During braking, as the speed signal $V_w$ starts to decrease in accordance with the decreasing wheel speed, the signal $V_w - N$ also decreases and the voltage across capacitor 62 follows so long as the decrease in the speed signal is slow enough to allow sufficient charges to be removed from the capacitor through circuit 76. However, if the speed signal decreases too rapidly, the voltage across capacitor 62 cannot follow due to the limited ability of circuit 76 to remove the charges therefrom. As a result, the voltage across capacitor 62, that is the reference speed signal, approaches the speed signal. When these two signals become equal, comparator 74 is triggered to produce an output signal, which in this embodiment is assumed to be relatively high voltage signal, which is applied to braking force attenuator 75 which in response thereto begins to attenuate the braking force. The signal from comparator 74 is also applied through resistor 92 to the base electrode of NPN transistor 90 which, together with NPN transistor 82 and the associated circuit elements, comprise the improvement to the speed logic otherwise illustrated herein and which illustrates the essence of the invention.

The emitter electrode of transistor 90 is connected to the return or ground bus 57, while its collector electrode is connected through resistor 88 to an A+ voltage terminal. The collector electrode is also coupled through capacitor 86 to the base electrode of transistor 82 whose collector electrode is connected to the first plate of capacitor 62 and whose emitter electrode is connected to the node of the voltage divider comprised of resistors 78 and 80 which are connected across the A+ voltage supply. The base electrode of transistor 82 is connected through resistor 84 to return bus 57. The appearance of a positive signal from comparator 74 causes transistor 90 to become conductive so that its collector electrode moves towards ground. This sudden movement in the voltage of the collector electrode is communicated to the base electrode of transistor 82 through capacitor 86. However, this negative signal is ineffective with respect to transistor 82 so that transistor remains non-conductive in its collector emitter path.

Subsequently, as seen in FIG. 1, the speed signal and hence the $V_w - N$ signal continue to decrease and the voltage across capacitor 62 continues to decay until that voltage becomes equal to $V_w + M$, at which time diode 58 becomes conductive and the voltage across capacitor 62, which is related to the reference speed, follows the $V_w + M$ signal.

When the speed signal reaches its first negative maximum as seen in FIG. 1, and then begins to increase, the voltage across capacitor 62, that is voltage $V_r$, becomes less than $V_w + M$, so that diode 58 is again back-biased. However, at the same time $V_r$ is greater than $V_w - N$ so that both operational amplifiers 50 and 52 are ineffective. Thus, charges continue to drain off from capacitor 62 through circuit 76 until eventually $V_r$ becomes less than the speed signal $V_w$, at which time the signal from comparator 74 is extinguished causing braking force attenuator 75 to now automatically begin to reapply braking force.

Figure 4:
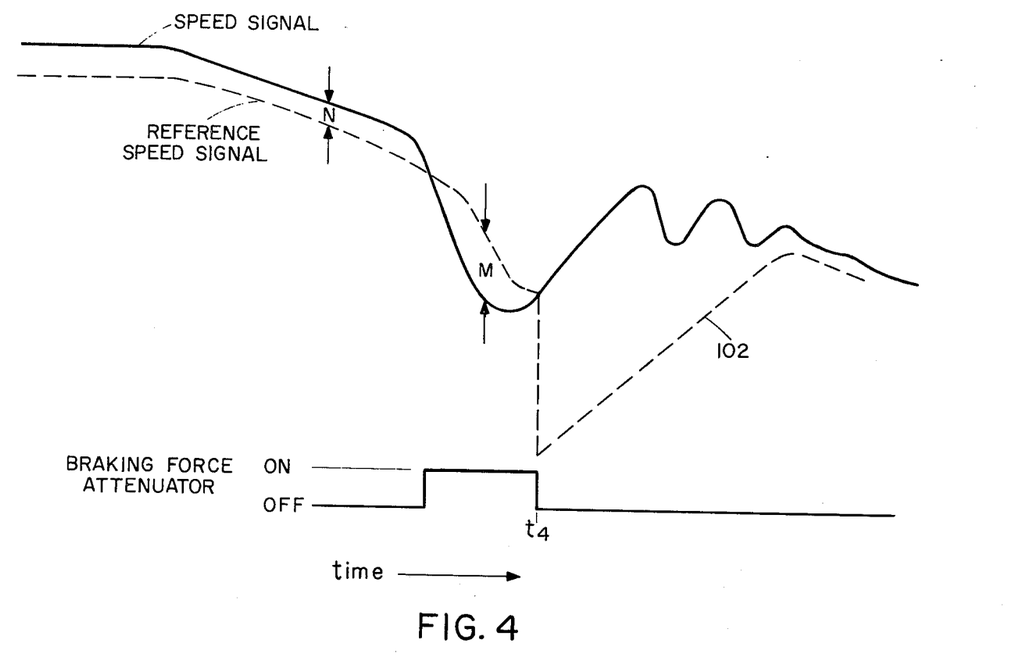
FIG. 4 comprises a set of curves similar to those of FIG. 1 but illustrating the preformance of the system of FIG. 3.

The negative-going signal from comparator 74 is applied through resistor 92 to the base electrode of transistor 90 causes that transistor to become non-conductive with the result that the voltage at its collector electrode swings towards the A+ potential level. This is communicated across capacitor 86 to the base electrode of transistor 82, temporarily triggering that transistor conductive so that capacitor 62 is discharged through the collector emitter circuit of transistor 82 to the voltage level at the node between resistor 78 and 80. This action is seen in FIG. 4, reference to which should now also be made. FIG. 4 shows curves similar to those shown in FIG. 1 except that at time $t_4$, at which time the signal from comparator 74 is extinguished, the effect of the invention is shown as causing the reference speed signal to suddenly drop due to the discharge of capacitor 62 as described above. Thereafter, capacitor 62 will be charged from operational amplifier 50 in accordance with the time constant circuit comprised of resistor 61 an capacitor 62. The increasing reference speed signal is seen as the upward sloping line 102 of FIG. 4 as the reference speed signal approaches its normal value at $V_w - N$. It should be noted that subsequent to $t_4$, while the reference speed signal is depressed below its normal value due to the operation of the invention, the rapidly fluctuating speed signal caused by wheel wrap-up, does not pass through the reference speed signal and no false triggering of the braking force attneuator occurs. A particular feature of the invention is that during the time that the reference speed signal is depressed it is still possible for the speed signal to pass through the reference speed signal, thus causing another episode of braking force attenuation, if the drop in the speed signal becomes great enough. This invention thus differs from a blanking circuit which merely blanks the braking force attenuation criteria for a predetermined period after $t_4$, during which period it is generally impossible to automatically release braking force. Also note that since the reference speed signal ramps upward after $t_4$ toward its normal value, as the time from $t_4$ increases it becomes easier (requires increasingly less speed signal drop) to cause the next episode of brake attenuation. This is desirable since fluctuations of the speed signal due to wrap-up become less severe as time past $t_4$ increases and any decrease in the speed signal severe enough to cause the speed signal to pass through the reference speed signal before the reference speed signal has returned to the $V_w - N$ level is apt to be caused by valid skid conditions such as by the vehicle suddenly encountering a particularly slippery patch in the road.

Figure 5:
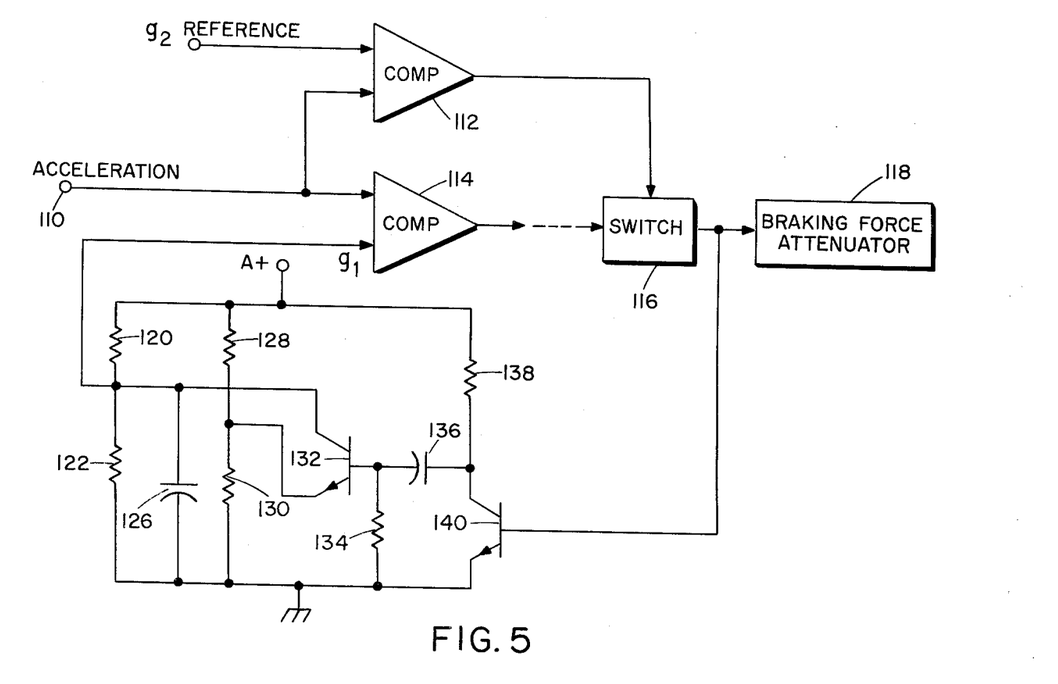
FIG. 5 is a modified schematic which embodies the invention in an adaptive braking system using acceleration logic.

Refer now to FIG. 5 which illustrates the use of the invention in an acceleration logic controlled adaptive braking system. In this figure an acceleration signal, which is a d.c. voltage correlated to the acceleration of the vehicle wheel or other power train structure, is applied at terminal 110 and is one input to comparators 112 and 114. The second input to comparator 114 is a voltage from the node of the voltage divider comprised of resistors 120 and 122 connected across a voltage source and corresponds to the $g_1$ reference of FIG. 2. The second input to comparator 112 is a $g_2$ reference which corresponds to the $g_2$ reference of FIG. 2. In operation, if the wheel decelerates sufficiently after the brakes have been applied, the acceleration signal at terminal 110 will eventually reach the $g_1$ reference level, at which time comparator 114 will generate an output. This output can be applied directly through switch 116 to braking force attenuator 118 to thereby commence to attenuate braking force, or alternately the output signal of comparator 114 can be applied to some other circuit symbolized by the dashed line at the input to switch 116, which delays the energizing of the braking force attenuator until some other predetermined wheel performance is satisfied, such as further deceleration of the wheel or further slowing of the wheel. Switch 116 in this embodiment is in the nature of a flip-flop which generates a positive-going output signal to energize braking force attenuator 118 to attenuate the braking force when it receives the output signal from comparator 114 and is subsequently reset by the output signal from comparator 112 as will be described below. In any event, the exact means for energizig the braking force attenuator to attenuate the braking force will not comprise a part of this invention.

The positive-going signal applied to attenuator 118 is also applied to the base electrode NPN transistor 140. This transistor, together with trransistor 132 and associated circuitry, particularly illustrates a form of the present invention. The positive-going signal at the base electrode of transistor 140 will not affect the circuitry, as will be explained below, so that the voltage at the node of resistors 120 and 122, the $g_1$ reference signal, remains at the $g_1$ level.

When the $g_2$ reference is eventually reached by the acceleration signal, comparator 112 generates an output which is applied to switch 116 to thus cause the signal to attenuator 118 to make a negative-going transition. In response thereto, the attenuator automatically begins to reapply braking force. The same negative-going signal is also applied to the base electrode of transistor 140. That transistor has a collector electrode connected through resistor 138 to the A+ voltage terminal and also through capacitor 136 to the base electrode of NPN transistor 132. The emitter electrode of transistor 140 is connected to the ground return. The collector electrode of transistor 132 is connected to the node between resistors 120 and 122, while the emitter electrode is connected to the node between resistors 128 and 130 which are connected across the voltage source. Resistor 134 connects the base electrode of transistor 132 to ground, while capacitor 126 connects the collector electrode of transistor 132 to ground. The negative-going signal at the base electrode of transistor 140 causes its collector electrode to move in a positive direction. This positive-goingg signal is coupled through capacitor 136 to the base electrode of transistor 132 which thereby is triggered conductive. This discharges capacitor 126 to the voltage at the node of resistors 128 and 130, hence, lowering the $g_1$ reference. Thereafter, the $g_1$ reference is restored to its normal value at capacitor 126 by the voltage source acting through resistor 120 in accordance with the time constant determined by resistor 120 and capacitor 126. It should now be obvious that during the time the $g_1$ reference is below its normal value it will require greater deceleration of the wheel to cause the braking force attenuator to again be energized to attenuate braking force. Thus, it can be seen that the undesired effects of wrap-up are eliminated, while retaining the desired feature of allowing braking force to be attenuated if wheel skid becomes more imminent than normally requires to attenuate braking force.

Figure 6:
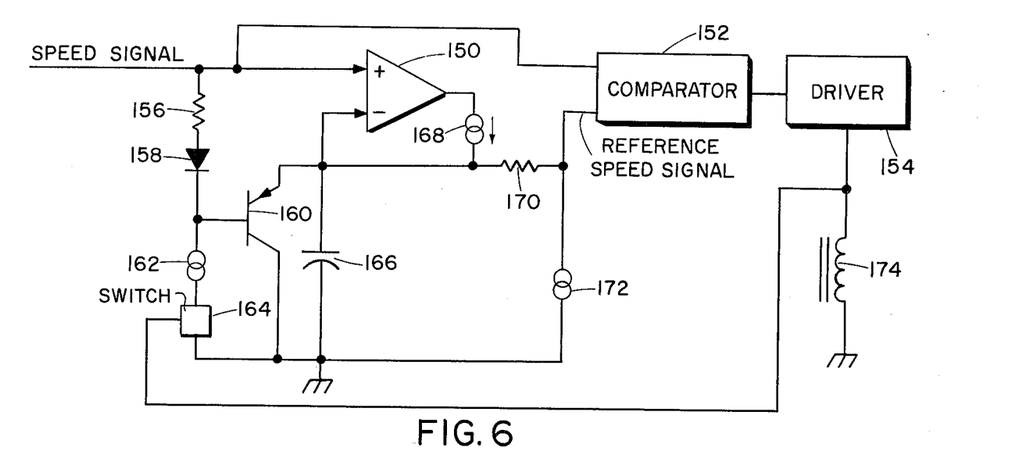
FIGS. 6, 7 and 8 are modified schematics which illustrate further forms of the invention.

Refer now to FIG. 6 which shows another embodiment of the invention as used in a speed logic adaptive braking system which differs somewhat in operation from the adaptive braking system described with respect to FIG. 3 and the curves of FIG. 1. The black box operation of the present adaptive braking system is generally identical to that described with respect to the curves of FIG. 1 except that the offset M is not maintained when the reference speed signal is above the speed signal. Rather, the reference speed signal is allowed to decay on a constant slope while above the speed signal until it passes through the speed signal. At that time the invention operates to pull down the reference speed signal as in the earlier embodiments. Specifically, the speed signal is applied as an input on the non-inverting input terminal of operational amplifier 150, connected to have unity gain, and also as one input comparator 152. Resistor 156, diode 158, constant current sink 162 and normally open switch 164 are connected between the non-inverting input terminal of operational amplifier 150 and a voltage return bus, suitable ground.

Operational amplifier 150 operates as a current source whose output terminal is connected through constant current device 168 to its inverting input terminal and also to the first plate of memory capacitor 166 and the emitter electrode of PNP transistor 160 whose collector electrode is connected to ground and whose base electrode is connected to the junction of diode 158 and current sink 162. Capacitor 166 first plate is connected through resistor 170 as the second input to comparator 152 and through constant current sink 172 to ground. The output terminal of comparator 152 is connected to a braking force attenuator represented by driver 154 and solenoid valve winding 174. The output signal from driver 154 is also used to operate switch 164.

In operation, since switch 164 is normally open, the emitter-collector circuit of transistor 160 is normally non-conductive. Operatonal amplifier 150 together with current device 168 act to maintain a voltage across capacitor 166 equal to the voltage at the non-inverting input terminal of operational amplifier 150. In other words, the circuit normally operates to maintain a signal equal to the speed signal across capacitor 166.

Current device 168 also supplies a constant current through resistor 170 for constant current sink 172. This results in a voltage drop across resistor 170 which corresponds to the offset N of FIG. 1. Thus, there is normally applied at the second input of comparator 152 a reference speed signal equal to the speed signal less a quantity N. Also as described with respect to the system of FIG. 3, the decay rate of capacitor 166 is limited, in this embodiment by constant current sink 172. Thus, if after the vehicle is braked the speed signal should decay at a rate greater than capacitor 166 can follow, the signal across capacitor 166 would no longer track the speed signal downward but rather would decay along the slope determined by current sink 172 until the speed signal dropped through the reference speed signal, at which time comparator 152 is triggered to generate an output signal which is applied through driver 154, whose resultant output is a relatively high signal, to winding 174 which in response thereto operates to begin attenuation of the braking force.

Switch 164 is functionally similar to the circuit comprised of transistors 82 and 90 of FIG. 3 in that it does not respond to positive transitions of driver 154 output signals.

Subsequently, the speed signal will begin to increase as the reference speed signal continues to drop until the two signals again cross, at which time comparator 152 is triggered to extinguish its output signal. The output from driver 154 goes low thus deenergizing winding 174 which causes the braking force attneuator to begin restoration of braking force. Switch 164 responds to the negative-going transition and momentarily closes thus permitting current to flow therethrough from constant current sink 162. This constant current also flows through resistor 156 and diode 158 so that the resulting voltage level at the base electrode of transistor 160 is a predetermined fixed amount below the level of the speed signal. In other words, the new signal at the base electrode of transistor 160 corresponds to the speed represented by the instantaneous speed signal less a predetermined constant speed. Since transistor 160 is an emitter follower, capacitor 166 is discharged to this new signal level and then recharges in accordance with constant current device 168.

Of course, the reference speed signal is similarly pulled down and subsequently rebuilt in accordance with the signal across capacitor 166 and the drop through resistor 170. Note that in the present embodiment the reference signal is pulled down a predetermined amount regardless of the instantaneous level of the speed signal, whereas in the embodiment of FIG. 3 the reference was pulled down to a predetermined level.

Figure 7:
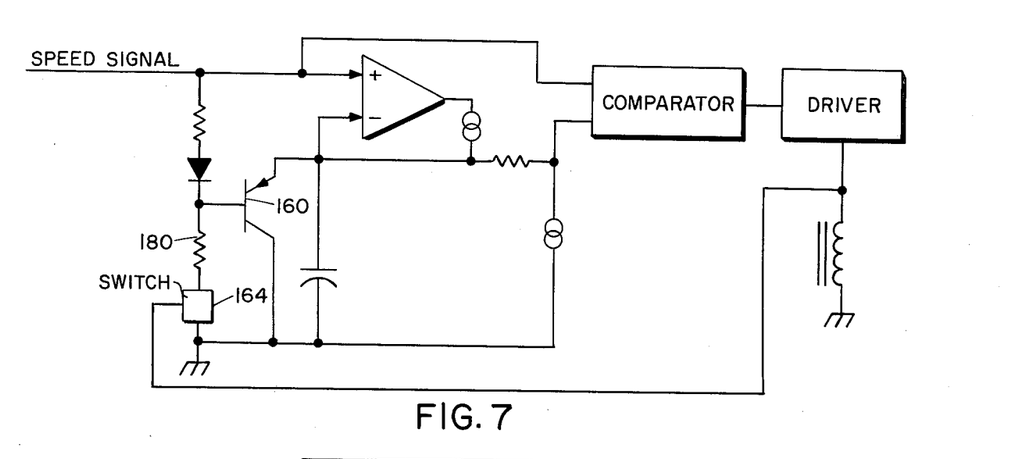

Refer now to FIG. 7 which is almost identical to FIG. 6 except that current source 162 of FIG. 6 is replaced by resistor 180. In this embodiment, when switch 164 is closed by the negative-going transition of the driver output signal, the voltage level at the base electrode of transistor 160 drops below the level of the speed signal by an amount proportional to the instantaneous value of the speed signal. Thus, as should now be obvious, at higher instantaneous speeds (higher speed signals) the reference speed signal is pulled down further than at lower instantaneous speeds.

Figure 8:
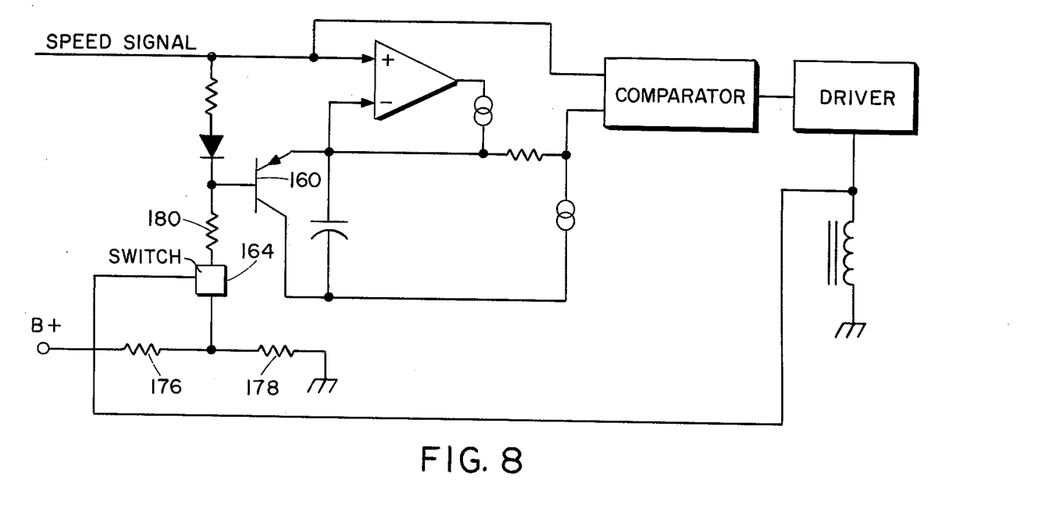

The circuit of FIG. 8, reference to which should now be made, is similar to the circuit of FIG. 7 except that switch 164 is returned to the voltage level at the junction of resistors 176 and 178 which comprise a voltage divider across a B+ voltage source. In this embodiment, the speed reference signal is pulled down by an amount which is comprised of a factor proportional to the instantaneous level of the speed signal and a constant factor in accordance with the voltage level at the junction of resistors 176 and 178.

Having described various embodiments of the invention in various environments one skilled in the art should now be equipped to adapt the invention to his specific needs and in his specific environment. Thus, the invention is not to be limited to the exact forms shown but rather is to be limited only by the true spirit and scope of the appended claims.

The invention claimed is:

1. In a wheeled vehicle having first means in contact with a road bed and braked by a braking force, an adaptive system comprising means for attenuating said braking force when energized into a first state and for restoring braking force when energized into a second state and control means for energizing said means for attenuating into at least said first and second states, said control means including means responsive to motion of said first means for generating performance signals correlated to the dynamic preformance of said first means; said control means energizing said means for attenuating into said first state when said performance signals satisfy first predetermined performance criteria having a normal level, satisfaction of the first performance criteria by said performance signals being indicative of wheel skid imminence and subsequently energizing said means for attenuating into said second state when said performance signals satisfy second predetermined performance criteria, and, means for altering said first predetermined criteria in a direction away from satisfaction of said performance criteria by said preformance signals to a level indicative of more imminent wheel skid than normal and in response to the energizing of said means for attenuating into said second state and including means responsive to the alteration of said first predetermined criteria for subsequently and relatively slowly restoring said first predetermined criteria to the normal level whereby during the time that said first predetermined criteria is being restored the performance signals must be indicative of more imminent wheel skid than normal in order to satisfy the altered criteria.

2. In a vechicle having rotating means in contact with a road bed and braked by a braking force, an adaptive braking system comprising:
means for attenuating said braking force when energized into a first state and for restoring braking force when subsequently energized into a second state;
control means for energizing said means for attenuating into at least said first and second states in response to speed signals, said control means including means for generating said speed signals correlated to the rotational speed of said rotating means, said control means energizing said means for attenuating into said first state when said speed signals satisfy first predetermined speed criteria having a normal level, satisfaction of the first speed criteria by said speed signals being indicative of wheel skid imminence and subsequently energizing said means for attenuating into said second state when said speed signals satisfy second predetermined speed criteria, and, means for altering said first predetermined criteria in a direction of decreased speed to a level indicative of more imminent wheel skid than normal in response to the energizing of said means for attenuating into said second state and including means responsive to the alteration of said first predetermined criteria for subsequently and relatively slowly restoring said first predetermined criteria to the normal level whereby during the time that said first predetermined criteria is being restored the speed signals must be indicative of more imminent wheel skid than normal in order to satisfy the altered criteria.

3. The adaptive braking system of claim 2 wherein said rotating means comprises a vehicle wheel.

4. The adaptive braking system of claim 2 wherein said rotating means comprises the vehicle drive shaft.

5. The adaptive braking system of claim 2 wherein said rotating means comprises a portion of the vehicle drive train.

6. In a vehicle having rotating means in contact with a road bed and braked by a braking force, an adaptive braking system comprising:
means for attenuating said braking force when energized into a first state and for restoring braking force when subsequently energized into a second state;
a speed sensor coupled to and generating a first signal proportional to the rotational speed of said rotating means;
means for generating a second signal offset from said first signal in a direction indicative of lesser rotational speed;
means for generating a third signal offset from said first signal in a direction indicative of greater rotational speed;
a memory device normally storing a selected one of said second and third signals, said memory device including means for limiting the rate of change of the stored signal in said memory device in a direction indicative of decreasing rotational speed while said second signal is selected and for subsequently selecting said third signal if said second signal changes faster than said memory device is permitted by said means for limiting and for limiting the rate of change of the signal stored in said device in a direction of increasing rotational speed while said third signal is selected and for subsequently selecting said second signal if said third signal changes faster than permitted by said means for limiting;
means comparing said first signal with the stored signal for energizing said means for attenuating into said first and second states; and,
means for altering the stored signal in a direction of decreased rotatioal speed in response to the energizing of said means for attenuating into said second state and including means responsive to the alteration of said stored signal for subsequently increasing the stored signal relatively slowly in the direction of increasing rotational speed from a level below the level of said second signal toward said second signal.

7. The adaptive braking system of claim 6 wherein said first, second and third signals comprise d.c. voltage levels and said memory device comprises a capacitive device.

8. The adaptive braking system of claim 7 wherein said means for altering comprises switching means shunting said capacitive device and responsive to the energizing of said means for attenuating into said second state for momentarily discharging said capacitive device.

9. The adaptive braking system of claim 6 wherein said means for altering comprises means responsive to the energizing of said means for attenuating into said second state for changing the stored signal in the direction of decreased rotational speed to a level indicative of a predetermined fixed rotational speed.

10. The adaptive braking system of claim 6 wherein said means for altering comprises means responsive to the energizing of said means for attenuating into said second state for changing the stored signal in the direction of decreased rotational speed by an amount related at least to the instantaneous level of said first signal.

11. The adaptive braking system of claim 6 wherein said means for altering comprises means responsive to the energizing of said means for attenuating into said second state for changing the stored signal in the direction of decreased rotational speed by an amount related to the instantaneous level of said first signal and a fixed predetermined level.

12. In a vehicle having rotating means in contact with a road bed and braked by a braking force, an adaptive braking system comprising:
   means for attenuating said braking force when energized into a first state and for restoring braking force when subsequently energized into a second state;
   sensor means for generating a first signal proportional to acceleration of said rotating means;
   a source of a first reference at a first level;
   a source of a second reference;
   means responsive to said first signal for at least initiating action to energize said means for attenuating into said first state when said first signal attains said first reference and for energizing said means for attenuating into said second state when said first signal subsequently attains said second reference; and,
   means for altering said first reference in a direction of increased negative acceleration in response to the energizing of said means for attenuating into said second state and including means responsive to the alteration of said first reference to relatively slowly restore said first reference toward said first level.

13. The adaptive braking system of claim 12 wherein said first signal and said first and second references comprise d.c. voltage levels.

14. An adaptive braking system as recited in claim 13 wherein said source of a first reference at a first level comprises a voltage source and a voltage divider connected thereacross, said first reference being obtained from a point interior thereof, and wherein said means for altering and to restore comprise a capacitor connected into said voltage divider and switching means responsive to the energizing of said means for attenuating into said second state for momentarily discharging said capacitor.

15. In a vehicle having rotating means in contact with a road bed and braked by a braking force, an adaptive braking system including means for attenuating said braking force when energized into a first state and for restoring braking force when subsequently energized into a second state, said adaptive braking system additionally comprising:
   speed sensor means coupled to said rotating means for generating a first proportional to the rotational speed thereof;
   memory means for normally generating a second signal having a normal level offset a predetermined amount from said first signal in a direction indicative of lesser rotational speed and including means for limiting the rate of change of said second signal in a direction indicative of decreasing speed from a time when said second signal is offset from said first signal in a direction indicative of lesser rotational speed and continuing at least during a portion of the time said second signal is offset from said first signal in a direction indicative of greater rotational speed;
   means comparing said first signal with said second signal for energizing said means for attenuating into said first and second states; and,
   means for altering said second signal in a direction of decreased rotational speed in response to the energizing of said means for attenuating into said second state and including means responsive to the alteration of said second signal for subsequently increasing said second signal relatively slowly in a direction of increasing rotational speed from a level below the normal level of said second signal toward the normal level of said second signal.

16. The adaptive braking system of claim 15 wherein said means for altering comprises means responsive to the energizing of said means for attenuating into said second state for changing said second signal in the direction of decreased rotational speed to a level indicative of a predetermined fixed rotational speed.

17. The adaptive braking system of claim 15 wherein said means for altering comprises means responsive to the energizing of said means for attneuating into said second state for changing said second signal in the direction of decreased rotational speed by an amount related at least to the instantaneous level of said first signal.

18. The adaptive braking system of claim 15 wherein said means for altering comprises means responsive to the energizing of said means for attenuating into said second state for changing said second signal in the direction of decreased rotational speed by an amount related to the instantaneous level of said first signal and a fixed predetermined level.

19. The adaptive braking system of claim 15 wherein said first and second signals comprise d.c. voltage levels and said memory means comprises a capacitor.

20. The adaptive braking system of claim 19 wherein said means for subsequently increasing comprises resistance means cooperating with said capacitor to comprise a time constant circuit.

* * * * *